Feb. 8, 1927.
C. P. DERLETH
1,617,014
PROCESS FOR DISPOSAL OF SEWAGE
Filed Feb. 7, 1922
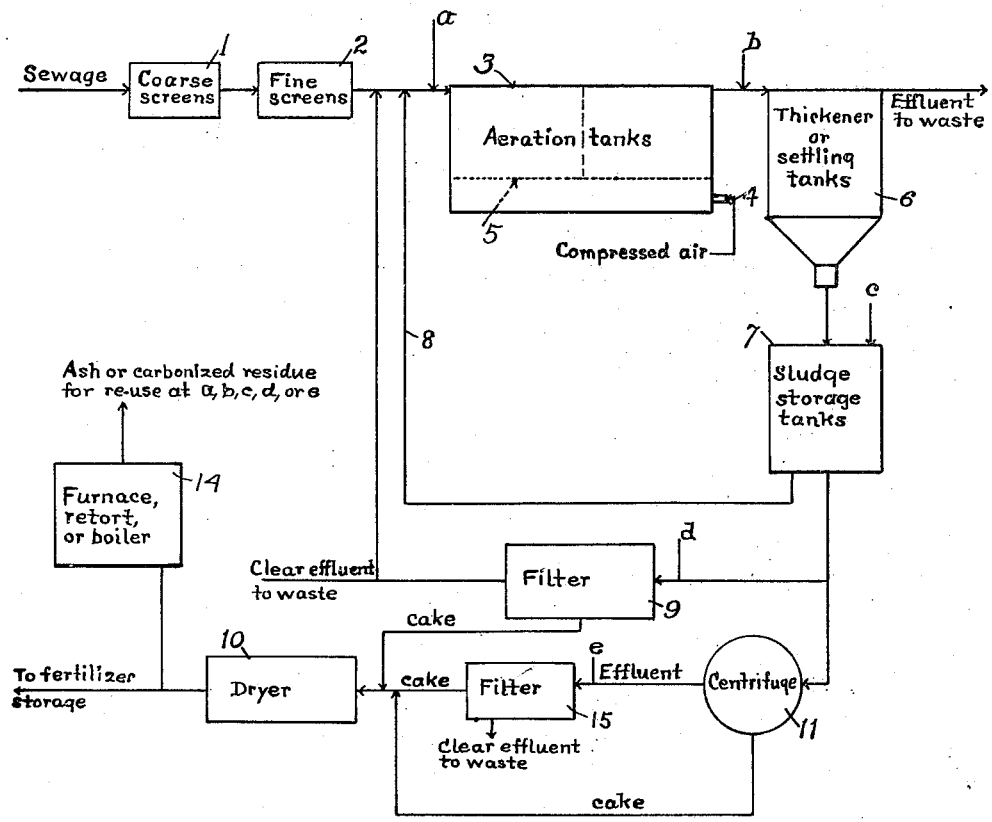
Inventor:
Charles P. Derleth
by Arthur P. Knight
his Attorney Patented Feb. 8, 1927.

1,617,014

UNITED STATES PATENT OFFICE.

CHARLES P. DERLETH, OF CHICAGO, ILLINOIS, ASSIGNOR, BY MESNE ASSIGNMENTS, TO THE CELITE COMPANY, A CORPORATION OF DELAWARE.

PROCESS FOR DISPOSAL OF SEWAGE.

Application filed February 7, 1922. Serial No. 534,666.

This invention relates to the treatment of sewage for the production of a clear effluent and recovery or separation of sludge material therefrom, and the main object of the invention is to provide means for effectively separating the solid matter from the sewage and particularly from the sludge obtained by settling or thickening of the sewage. In the disposal of sewage it is usual to subject the sewage to settling or thickening operation, generally after activating and aerating operations have been performed on the same; the effect of such thickening operation being to produce a substantially clear effluent and a comparatively thick sludge, which is separated from the effluent. Such sludge still contains a large amount of water, as high as 97 per cent of the sludge consisting of water, and in order to dispose of the sludge, it is desirable to remove most of such water therefrom. The sludge has some value as a fertilizing material, and in order to enable it to be shipped for this purpose, it is desirable to eliminate as much as possible of the water in order to reduce the freight charges to a minimum and to bring the material to a condition in which it can be stored, shipped and used as a substantially dry substance. For this purpose, it has been proposed to filter the sludge in suitable filter presses, but difficulty has been encountered in such filtration by reason of the fact that the solids in the sludge consist largely of particles so small as to pass through the filter cloth and thus prevent production of a clean filtrate, and there is moreover a tendency of the solids to clog the filter, so as to seriously retard the filtration operation and limit the capacity of the filter plant and to make the labor charges too great.

In order to overcome the objections above referred to, the use of chemical reagents has been proposed, for example: lime has been used, but results have been unsatisfactory from a mechanical standpoint and also because the lime renders the sludge unfit for use as a fertilizer. Sulphuric acid has been used and is effective to some extent and in some cases in increasing the rapidity of filtration and also in decreasing the bacterial concentration of the filtrate but the addition of acid is ineffective at times, and in any case is expensive.

I have found that substantially uniform filtration conditions with clear filtration and satisfactory rate of filtration can be effected by the use of a filter-aid consisting of a porous mineral substance such as diatomaceous earth in a suitable state of division, this filter-aid being mixed with the sewage or with the sludge at any stage of the operation before filtration. An important effect of this filter-aid is to effect coagulation or agglomeration of the finer particles of the sludge into aggregates of sufficient size to be caught by the filter medium, so as to give a clear filtrate. The diatomaceous earth or filter-aid also increases the rate of filtration, as it becomes deposited on the filter along with the solid constituents of the sludge, thereby maintaining the porosity or permeability of the filter cake, giving uniform and rapid filtration and a solid filter cake of minimum water content and producing a residue which is suitable for use as a fertilizer. A further important effect of the diatomaceous earth is that it retains to a large extent the bacteria present in the sewage and prevents such bacteria from passing through the filter media, so that the filtrate is relatively free from bacteria. The diatomaceous earth also selectively adsorbs fatty matter and other impurities from the sewage to a considerable extent, with the result that such matters are removed from the effluent in the settling and from the filtrate in the filtration operations.

The accompanying drawing is a flow sheet of a process of sewage disposal utilizing my invention, and the process will be described with reference to such flow sheet.

The sewage treated by the process may be ordinary city sewage, or it may comprise the waste liquids from industrial establishments and may vary in composition according to the nature of the sewage from such establishments. The sewage may be passed first through suitable screens, for example, a coarse screen 1 and a fine screen 2, which may be of a drum type, and the liquid from which the coarser solids have been separated by such screens then passes to aeration tanks 3, in which the sewage is subjected to aeration by forcing low pressure air from a supply pipe 4, through a pervious floor 5 at the bottom of the aeration tanks, the result of the action of such air, assisted by the action of the activated sludge in the tanks 3, being to change the organic constituents of the sewage so as to render the effluent relatively innocuous. It is well known that the use of large quantities of air in this manner in the presence of the activated sludge produces nitrification of the organic material. This action is due to the activity of certain aerobic bacteria contained in the activated sludge. The growth of such bacteria is promoted by the aerating operation and it is the change in composition produced by these bacteria which renders the sewage relatively innocuous. The sewage passes from the aeration tanks to a suitable settling or thickening apparatus indicated at 6, which separates the sewage into a clear effluent, which may pass off to waste or may be utilized for irrigation or otherwise, and a sludge, which is drawn off to a storage tank 7. A portion of the sludge may pass, as indicated at 8, back to the aeration tanks 3 for inoculation purposes in activating the sludge in said tanks. The larger proportion of the sludge passes to a filter plant 9 wherein the sludge is subjected to filtration in filter presses, or similar apparatus, to produce a solid residue which may be passed to a drier 10, and a filtrate, which if not sufficiently clear or stable may pass back to the aeration tanks 3 for retreatment, or more desirably such filtrate or a portion thereof may be run to waste.

In applying my invention to a process such as described, the filter aid, consisting of diatomaceous earth in a suitable state of division, for example: reduced to finely divided condition, may be supplied at any desired stage of the operation; for example, it may be supplied to the aeration tanks as indicated at $a$, to the dewatering or thickening apparatus as indicated at $b$, to the sludge storage as indicated at $c$, or to the sludge just as it passes to the filter press as indicated at $d$, or, if the dewatering is accomplished in centrifuge, at $e$, or at any two or more of these places. In any case, it is necessary to thoroughly mix the diatomaceous earth with the liquid to be treated. When the diatomaceous earth is supplied to the aeration tanks the agitation of the liquid in such tanks by the action of the air operates to distribute and mix the diatomaceous earth with the liquid. When the diatomaceous earth is added at the thickener 6, it should be done in such manner as to effectively distribute the diatomaceous earth into the liquid and the same is true when the diatomaceous earth is supplied to the sludge storage, or to the line leading to the filter plant. As the filter aid or diatomaceous earth operates to some extent in adsorbing fatty matter and other impurities in the sewage, it is desirable to add the diatomaceous earth to the aeration tanks, or to the settling tanks, so as to increase the efficiency of the aeration operation and to become mixed with the sewage before or during the aeration or the settling operations, so that such impurities settle with the diatomaceous earth into the sludge. The amount of diatomaceous earth used may be varied according to the character of the sewage treated, and the mechanical treatment to which the sewage is subjected. As an example of the process, I may use about eight hundred pounds of diatomaceous earth to one million gallons of sewage, this amount of sewage producing about twelve thousand gallons of sludge containing in the summer, one to three per cent of solids and in the winter about one to two per cent of solids, or an average of about one to one and a half tons of dried cake per one million gallons of sewage. Such dried cake may contain about twenty-five per cent of diatomaceous earth when the latter is used as a filter-aid as above set forth.

In case acid is used along with the diatomaceous earth, it may be added either at the same point as the diatomaceous earth, or at any other part of the process as desired. The diatomaceous earth may be used as a vehicle or carrier for the acid, the acid being added to the diatomaceous earth, and the mixture then added to the sludge. In any case, the use of diatomaceous earth reduces the amount of acid, or other chemical required to produce satisfactory filtration and in some cases enables use of acid or other chemicals to be dispensed with. Instead of acid, any well known flocculating agent may be used according to the character of the liquid being treated, and the nature of the impurities contained therein.

The addition of the diatomaceous earth to the activated sludge also acts to selectively absorb or adsorb, thus collecting fatty matter as well as colloidal and suspended matter in the sewage and to put the solid material in such condition that it can be removed from suspension by filtration in the ordinary type of filter presses.

The use of diatomaceous earth also makes possible the dewatering of activated sludge from 99 per cent moisture to 95 per cent or less by settling operation in the usual type of thickeners, and it also provides an inert material which can be mixed with the sludge without any detrimental effect on the use of the resulting cake as a fertilizer. By using the proper quantity of diatomaceous earth, the bacteria in the effluent or filtrate resulting from filtration of the activated sludge in the filter presses, may be considerably reduced. If found desirable, the sludge may be heated before filtration as it has been found in vacuum filtration that heating the sludge just prior to filtering, aids it to some extent.

In some cases the sewage from the sewer mains can be passed directly to the settling basins or towers omitting the preliminary screening or aeration. The effluent may be sufficiently free from organic matter to be stable and can be drawn off; the resulting thickened sludge may then have diatomaceous earth added, mixed and passed to the filters for the removal of sufficient water to get the suspended matter into a sufficiently solid state as to be readily and economically handled in the subsequent drying operation. The diatomaceous earth may be added to the incoming untreated sewage to facilitate the settling operation, or it may be added to the settled sludge just prior to filtration, or may be introduced and mixed with the sludge by pumping into the line leading to the filters, a suspension of diatomaceous earth in water or other liquid (such as acid, alum, etc.).

A centrifuge, indicated at 11, may be used for the separation of the major portion of solids from sludge, or may be used to further thicken the sludge to produce a sludge to be filtered (for example in filter 15) which has a lower moisture content. Diatomaceous earth may be added to the resultant sludge at any point prior to filtration, or may be mixed with the effluent from the centrifuge to permit the removal of the suspended organic matter contained therein by filtering, thus giving a clear effluent which may be passed to waste and which is stable and relatively free from bacteria. The diatomaceous earth may be added to the sewage prior to aeration, or before settling, or to the sludge before centrifuging to improve the operation or efficiency of that machine.

The resulting cake which is dried may be carbonized or burned in a furnace, retort or boiler, indicated at 14, instead of being used for fertilizer, the resulting ash or carbonized material being again used in the process as a filter aid, replacing all or part of the diatomaceous earth used in dewatering the sludge or used in the settling or aeration operation.

What I claim is:

1. The herein described improvement in activated sludge sewage disposal processes; consisting in introducing diatomaceous earth into the sewage prior to aeration thereof whereby nitrification and coagulation of the suspended solids in such sewage is accelerated; fats and oils are adsorbed by the diatomaceous earth and the subsequent filtration of the sludge is facilitated.

2. The herein described improvement in activated sludge sewage disposal processes; consisting in introducing diatomaceous earth into the inoculated sewage whereby coagulation of suspended solids in such sewage is accelerated and fats and oils are adsorbed by the diatomaceous earth, filtering the greater portion of the resultant sludge containing the diatomaceous earth to remove the solids and diatomaceous earth from the sewage; and returning a smaller portion of such sludge and diatomaceous earth into unfiltered sewage preparatory to the like treatment thereof.

3. The herein described improvement in activated sludge sewage disposal processes; consisting in introducing diatomaceous earth into inoculated sewage prior to aeration thereof, whereby nitrification and coagulation of suspended solids in such sewage is accelerated and oils and fats adsorbed; thereafter filtering the greater portion of the nitrified sludge containing the diatomaceous earth to remove the solids from the sewage; and finally returning a small portion of the unfiltered nitrified sludge and diatomaceous earth into unfiltered sewage preparatory to the like treatment thereof.

In testimony whereof I have hereunto subscribed my name this 19th day of January 1922.

CHARLES P. DERLETH.